April 28, 1953      E. H. PRICE      2,636,331
HARVESTER
Filed March 30, 1948      3 Sheets-Sheet 2
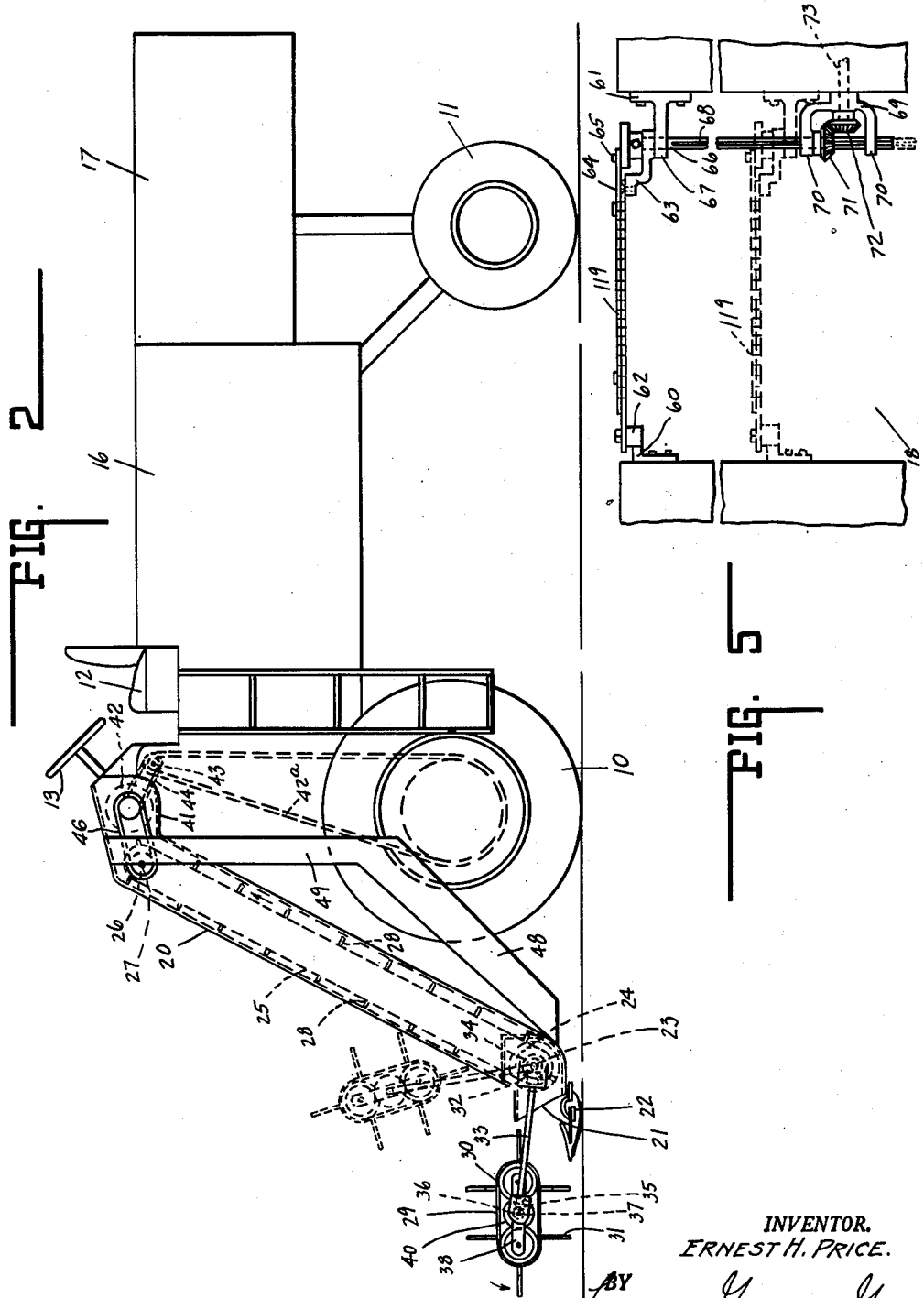
INVENTOR.
ERNEST H. PRICE.
BY
Lockwood, Goldsmith & Galt,
ATTORNEYS.

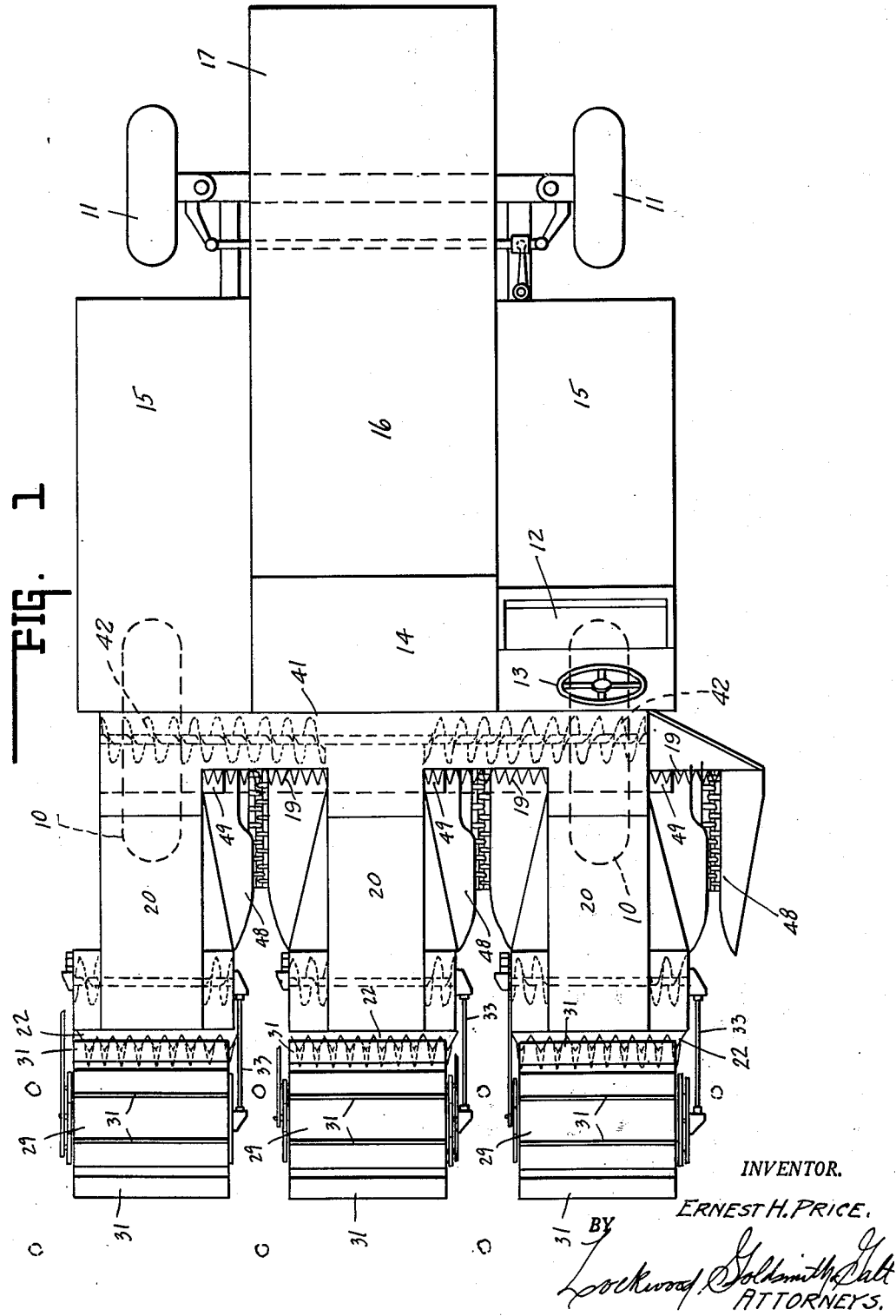

April 28, 1953 E. H. PRICE 2,636,331
HARVESTER
Filed March 30, 1948 3 Sheets-Sheet 3
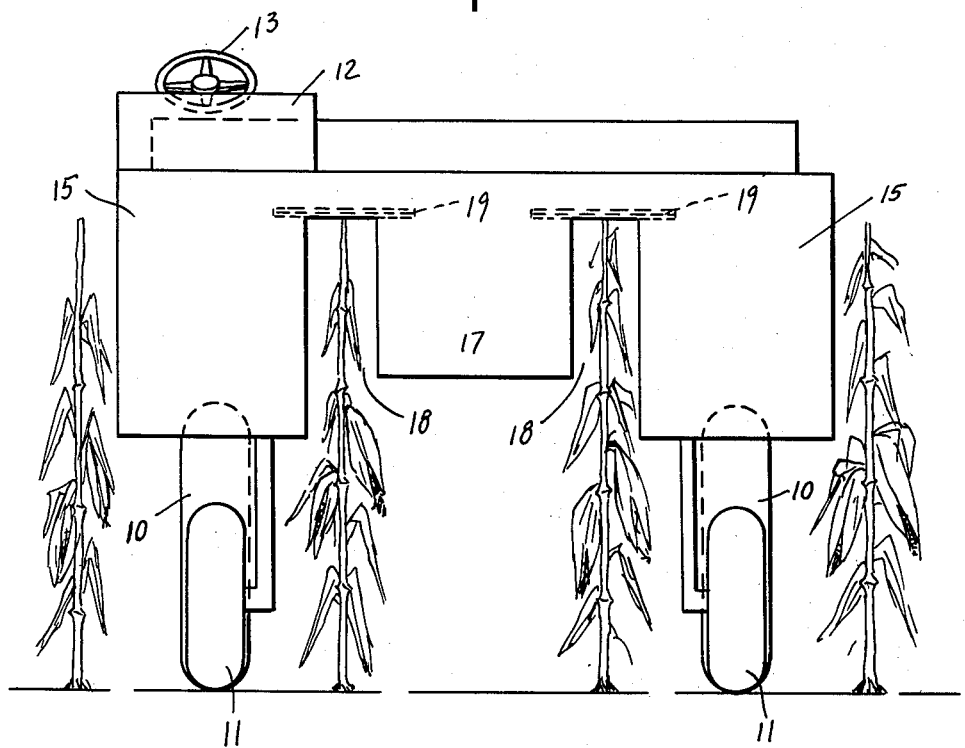
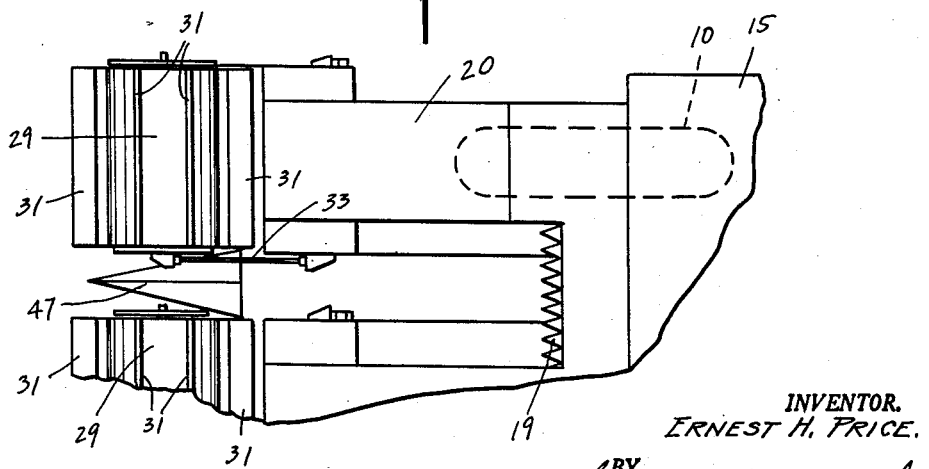
INVENTOR.
ERNEST H. PRICE.
BY
Lockwood Goldsmith & Galt.
ATTORNEYS.

Patented Apr. 28, 1953

2,636,331

UNITED STATES PATENT OFFICE 2,636,331

HARVESTER

Ernest H. Price, Danville, Ind.

Application March 30, 1948, Serial No. 17,852

6 Claims. (Cl. 56—122)

This invention relates to a harvester.

The chief object of the present invention is to provide a harvester that can operate in a field having dis-similar crops such as soybeans and corn, although it is not necessarily restricted to these two crops nor to a plurality of crops because it can be used in a single crop field as well.

The chief feature of the present invention resides in providing, for example, for a corn and a low earlier maturing crop, a harvester that can simultaneously harvest such low crop disposed between corn rows leaving the ears and major portion of the corn stalks unaffected, and a hybrid corn detasseler.

The aforesaid is accomplished by disposing the low crop harvester units in spaced relation so that same pass between corn rows, such units discharging in elevated relation to a threshing or like unit common to all units.

Other objects and features of the invention will be set forth more fully hereinafter.

The full nature of the invention will be understood from the accompanying drawings and the following description and claims:

In the drawings, Fig. 1 is a top plan view of a harvester embodying the invention, the corn top cutter and corn picker attachments being applied thereto.

Fig. 2 is a side elevation thereof, dotted lines indicating a retracted or nonworking position of the feeding reel mechanism, and the corn picking attachment being applied to the harvester.

Fig. 3 is a rear elevation of the harvester, the corn picking attachments and low crop harvesters being omitted.

Fig. 4 is a top plan view of a portion of the harvester provided with a divider or diverter attachment for single crop harvesting.

Fig. 5 is an enlarged front elevation of a detasseling device capable of inclusion in the invention, dotted lines indicating a second position thereof.

In the drawings, the harvesting mechanism is embodied in a vehicle wherein 10 indicates the forward wheels, 11 the rearward and steering wheels, 12 the operator's seat, 13 the steering wheel, 14 the engine, 15 the side bins or material receiving means, 16 the elevated threshing unit, and 17 the chaff and straw discharge, see Fig. 1.

The side bins 15, threshing units 16, and straw discharge elements 17 are so formed and assembled with one another as to provide a pair of continuous spaced tunnels, closed at their tops and disposed longitudinally of and in the underpart of said vehicle. The distance between the spaced tunnels corresponds with the distance between rows of standing crops so that the high standing crop rows will be accommodated within said tunnels as the vehicle advances, and the tops of the tunnels coincide approximately with the height of the said high standing crops. Forwardly of these tunnels and adjacent the tops thereof are corn stalk topping cutters 19 of conventional form and which are operated from the power of the engine by any suitable or approved means not shown.

Projecting forwardly and downwardly from the forward elevated portion of the vehicle structure and flanking the tunnels 18 are the low crop chutes 20. At the lower forward and open end 21 of each chute is disposed a sickle bar structure 22, deriving cutting power by means not shown from shaft 23. This shaft at the lower end of the chute carries a conveyor operable member 24.

Endless conveyor 25 associated with said member is disposed in said chute and at its upper end is associated with drive member 26 on shaft 27. The conveyor includes flights or bats 28.

Disposed in pivoted and advanced position in respect to the sickle and lower end of each chute is the reel structure 29, comprising an endless conveyor-like mechanism 30 with battens 31, the lower run of which moves rearwardly to force the low crop to the sickle bar for cutting, the cut crop falling into the open lower end 21 of chute 20 and thence being conveyed upwardly therein to the top of chute.

A bevel gear 32 on shaft 33 meshes with bevel gear 34 on shaft 23. Bevel gear 35 at the outer end of shaft 33 meshes with bevel gear 36 on shaft 37 carried by frame 38 in the ends of which are mounted the rotatable elements associated with conveyor 30, driven by a gear 40 on a shaft 37. The tiltable arm supports for said conveyor are omitted for clearness. However, same may be latched in lowered relation so the conveyor is disposed as shown by full lines in Fig. 2 or latched in elevated relation as shown by the dotted lines in said figure.

The upper ends of chutes 20 discharge to a transversely disposed passage forming structure 41 in which is disposed reverse flight worm conveyor 42. This worm draws the end chute cut crop toward the center. The center chute feeds centrally to structure 41.

Power is derived, see Fig. 2, from power shaft 43 which, as at 44, drives the worm and by endless drives 46 operates all conveyor elevators 25. Traction wheels 10 are driven by chains 42a from shaft 43. Shaft 43 is engine driven. Suitable clutches may be included where desired or required.

The collected crop discharges centrally and laterally of passage 41 and feeds to the engine operable threshing device 16. The seeds, beans, etc., then discharge to bins 15 and the vines, straw, chaff, and the like is discharged rearwardly.

As shown in Fig. 3 the tops of the corn stalks may be severed during the other crop harvesting. The tunnel height and width is such that the corn stalks with the ears thereon will be left standing after the harvester has processed the other crop.

Whenever the field includes but one crop there is applied between the chutes, see Fig. 4, the dividers or diverters 47. Thus these detachably supported members divide the crop between the reels and force same into the effective range of the sickles 22.

The harvester, see Figs. 1 and 2, when used for corn harvesting has detachably secured to it between chutes 20 the corn pickers 48 which through chutes 49 discharge the ears upwardly into the reverse flight worm conveyor 42 and from thence rearwardly into the desired bin or bins.

Thus, also, both crops may be simultaneously harvested when necessary or desired.

The present invention, therefore, has a wide variety of uses such as for corn harvesting, bean and like crop harvesting, harvesting of one crop without affecting another, or the simultaneous harvesting of two dissimilar, simultaneously maturing crops.

Reference will now be had to Fig. 5 herein a sickle structure 119 similar to topper 19, see Fig. 4 as provided. Disposed in the forward part of tunnel 18 and upon opposite sides thereof are the adjustably fixed brackets 60 and 61. A sickle blade is stationarily supported thereby at 62 and 63 respectively and thereabove is movable blade 64 crank activable as at 65.

The crank is carried by shaft 66 rotatable in bearing 67 of bracket 61. The shaft includes the longitudinal slot 68. A U-shaped bracket 69 rotatively supports said shaft. Between the arms 70 thereof and slidable on and keyed to the shaft is level gear 71. This meshes with driving level gear 72 on power shaft 73 driven by the engine.

Hybrid corn of a designated member grows to a uniform height. Different kinds have different heights. When same is to be detasseled the sickle 119 is properly adjusted and the invention then cuts off the tassels. Hence the present invention has an additional use. Note the detasseling sickle can be positioned at the tip and used for corn topping when harvesting low crops instead of cutter 19.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In a harvester, a wheel supported vehicle, a threshing unit carried by said vehicle at a relatively high level, material receiving means disposed adjacent the sides of said threshing unit and spaced apart therefrom to provide tunnels to accommodate the passage between the threshing unit and material receiving means of high crop growths, and spaced harvesting means supported on said frame adjacent said tunnels at a relatively low level for harvesting low crop growths.

2. A harvester as defined by claim 1, wherein the threshing means is singular, an elevator is provided for each low crop harvesting means, and elevated conveying means is provided for conveying the discharges from the low crop elevating means to said single threshing means.

3. A harvester as defined by claim 1, wherein the elevated conveying means comprises a reverse flight screw.

4. A harvester as defined by claim 1, wherein there is provided reel means forwardly and of a width substantially that of each low crop harvesting means.

5. A harvester as defined by claim 4, wherein each reel means is normally disposable adjacent the ground and is tiltable upwardly into inoperative position.

6. In a harvester, a wheel supported vehicle, an elevated threshing unit on said vehicle, spaced parallel tunnels disposed in the direction of travel of the vehicle and below the threshing unit thereof, a low crop cutter flanking each of said tunnels and disposed near the ground, an elevator for each low crop cutter to receive crops cut thereby, and a conveyor to receive cut material from said elevators to move the same into the threshing unit.

ERNEST H. PRICE.

References Cited in the file of this patent

UNITED STATES PATENTS

| Number | Name | Date |
|---|---|---|
| 724,345 | Sloane | Mar. 31, 1903 |
| 1,168,467 | Bell | Jan. 18, 1916 |
| 1,269,742 | Rhodes | June 18, 1918 |
| 1,833,001 | Smith | Nov. 24, 1931 |
| 2,217,872 | Lindgren et al. | Oct. 15, 1940 |
| 2,343,963 | Elliott | Mar. 14, 1944 |
| 2,349,905 | Hyman | May 30, 1944 |